(12) United States Patent
Roh et al.

(10) Patent No.: US 7,693,039 B2
(45) Date of Patent: Apr. 6, 2010

(54) APPARATUS AND METHOD FOR CARRIER FREQUENCY SYNCHRONIZATION IN AN OFDM SYSTEM

(75) Inventors: Hee-Jin Roh, Suwon-si (KR); Su-Jin Yoon, Suwon-si (KR); Min-Goo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 11/605,484

(22) Filed: Nov. 29, 2006

(65) Prior Publication Data

US 2007/0133391 A1    Jun. 14, 2007

(30) Foreign Application Priority Data

Nov. 29, 2005    (KR) .................. 10-2005-0115153

(51) Int. Cl.
*H04J 1/00* (2006.01)
*H04L 7/00* (2006.01)

(52) U.S. Cl. .................. 370/208; 370/343; 375/354

(58) Field of Classification Search .............. 370/208, 370/343, 344; 375/354
See application file for complete search history.

(56) References Cited

U.S. PATENT DOCUMENTS 6,363,084 B1* 3/2002 Dejonghe .............. 370/480

7,058,151 B1* 6/2006 Kim ....................... 375/355
7,215,636 B2* 5/2007 Seo et al. ................ 370/208
2005/0169408 A1 8/2005 Kim

FOREIGN PATENT DOCUMENTS

EP 1 195 961 A2 4/2002
KR 2002-0094609 12/2002

OTHER PUBLICATIONS

Chorng-Ren Sheu et al.; Joint Symbol, Frame, and Carrier Synchronization for Eureka 147 DAB System; pp. 693-697.

* cited by examiner

*Primary Examiner*—Nittaya Juntima
(74) *Attorney, Agent, or Firm*—Roylance, Abrams, Berdo & Goodman, L.L.P.

(57) ABSTRACT

An apparatus and method for carrier frequency synchronization in an Orthogonal Frequency Division Multiplexing (OFDM) system are provided for correcting an initial carrier frequency offset in the OFDM system. A metric generator for frequency estimation performs a first accumulation process for a value computed by multiplying a Phase Reference Symbol (PRS) generated from a reception stage by a Fast Fourier Transform (FFT) output signal for an OFDM symbol in a PRS position within a frame, acquires a differential symbol from a product of adjacent FFT output symbols, performs a second accumulation process for a real part extracted from the differential symbol, and outputs a metric value for the frequency estimation. A maximal value-related index generator compares metric values for initial frequency estimation within a predetermined frequency offset estimation range, and selects and outputs a maximal metric value as a frequency offset estimate.

41 Claims, 10 Drawing Sheets

APPARATUS AND METHOD FOR CARRIER FREQUENCY SYNCHRONIZATION IN AN OFDM SYSTEM

CROSS-REFERENCE TO RELATED PATENT APPLICATION

This application claims the benefit under 35 U.S.C. §119(a) of a Korean Patent Application filed in the Korean Intellectual Property Office on Nov. 29, 2005 and assigned Serial No. 2005-115153, the entire disclosure of which is hereby incorporated by reference.

BACKGROUND OF THE INVENTION

1. Field of the Invention

The present invention generally relates to a wireless communication system based on Orthogonal Frequency Division Multiplexing (OFDM). More particularly, the present invention relates to an apparatus and method for correcting an initial carrier frequency offset in a wireless communication system based on OFDM.

2. Description of the Related Art

Wireless communication systems typically make use of a cellular communication scheme. These wireless communication systems make use of multiple access schemes for simultaneous communication with multiple users. For the multiple access schemes, Time Division Multiple Access (TDMA), Code Division Multiple Access (CDMA) and Frequency Division Multiple Access (FDMA) are typically used. With the rapid progress of CDMA technology, CDMA systems are developing from a voice communication system into a system capable of transmitting packet data at high speeds.

In order to overcome limitations in using code resources of the CDMA system, an Orthogonal Frequency Division Multiple Access (OFDMA) scheme has been used recently.

The OFDMA scheme is based on Orthogonal Frequency Division Multiplexing (OFDM). An OFDM system for transmitting data using multi-carrier is a type of Multi Carrier Modulation (MCM) system in which a serial symbol stream is converted into parallel symbol streams and is modulated into multiple subcarriers, that is, multiple subcarrier channels, orthogonal to each other.

The MCM-based OFDM scheme was first applied to High Frequency (HF) radio communications for the military in the late 1950's. The OFDM scheme for overlapping orthogonal subcarriers started to be developed in the 1970's. Since a problem exists in that it is difficult to implement orthogonal modulation between multiple carriers, the OFDM scheme has limitations in actual system implementation. However, in 1971, Weinstein, et al. proposed that OFDM modulation/demodulation can be efficiently performed using Discrete Fourier Transform (DFT). Thus, the OFDM technology has rapidly developed. Also, the introduction of a guard interval into which a Cyclic Prefix (CP) symbol is inserted further mitigates adverse effects of multipath propagation and delay spread on an OFDM system.

As a result, with the development of technology, the OFDM scheme has been widely used for digital transmission technologies such as Digital Audio Broadcasting (DAB), digital television (TV), Wireless Local Area Network (WLAN), Wireless Asynchronous Transfer Mode, (WATM), and the like. Although hardware complexity is an obstacle to implementation of the OFDM system, recent advances in digital signal processing technology including Fast Fourier Transform (FFT) and Inverse Fast Fourier Transform (IFFT) enable the OFDM system to be implemented. The OFDM scheme is analogous to a conventional Frequency Division Multiplexing (FDM) scheme, and can obtain optimal transmission efficiency when high-speed data is transmitted while maintaining orthogonality between multiple subcarriers. More specifically, the OFDM scheme leads to efficient frequency use and is robust to multipath fading, thereby obtaining optimum transmission efficiency upon transmission of high-speed data. The OFDM scheme uses overlapping frequency spectra, thereby efficiently using frequencies. The OFDM scheme is robust to frequency selective fading, multipath fading, and impulse nose. The OFDM scheme can reduce Inter Symbol Interference (ISI) using guard intervals and can easily design an equalizer structure in hardware. Therefore, the OFDM scheme is actively exploited in comunication system structures.

FIG. 1 is a block diagram illustrating physical layers for transmission and reception in a conventional OFDM system.

An input bit stream 101 to be transmitted is input to an encoder 102. The encoder 102 encodes the input bit stream 101 in a predefined scheme and then outputs the encoded bit stream to a Serial-to-Parallel Converter (SPC) 103. The SPC 103 converts the encoded serial bit stream into parallel bit streams and then outputs the parallel bit streams for which an IFFT process is performed. Thus, the parallel bit streams output from the SPC 103 are input to an IFFT processor 104. In this case, it is assumed that the parallel bit streams are N symbols. Further, it is assumed that the IFFT processor 104 receives the N symbols because the IFFT process is performed in a unit of N bit streams. Thus, the IFFT processor 104 receives the N parallel symbols and performs the IFFT process for the N parallel symbols to be transmitted, thereby transforming frequency domain symbols into time domain symbols. The time domain symbols are input to a Parallel-to-Serial Converter (PSC) 105. The PSC 105 converts the N time domain symbols input in parallel into N serial or sequential bit streams and then serially or sequentially outputs the N bit streams. Hereinafter, the sequentially output N bit streams are referred to as "OFDM symbols".

An OFDM symbol is input to a CP adder 106. The CP adder 106 copies a predefined number of last bits of the input OFDM symbol and then inserts the copied bits before a first bit of the OFDM symbol. A CP is added to remove the effect of a multipath channel. The OFDM symbol to which the CP has been added is input to a Digital-to-Analog Converter (DAC) 107. Then, the DAC 107 converts input digital symbols into analog symbols and transmits the analog symbols to a receiver.

The transmitted analog symbols are input to the receiver through a predefined multipath channel 110. Now, a structure and operation of the receiver will be described.

An Analog-to-Digital Converter (ADC) 121 of the receiver receives analog signals transformed into the time domain in the IFFT processor 104 of a transmitter and then converts the received analog signals into digital signals. The ADC 121 inputs the digital signals to a CP remover 122. The CP remover 122 removes CPs, that is, CP symbols, contaminated in a multipath environment. A signal from which the CPs have been removed in the CP remover 122 is a serial signal. Thus, the signal from which the CPs have been removed is input to a SPC 123. The SPC 123 converts serially input symbols into parallel symbols in a unit of N symbols and then outputs the parallel symbols.

The serially input symbols are converted into the parallel symbols in the unit of N symbols because the transmitter performs the IFFT process in the unit of N symbols. Thus, an FFT processor 124 receives N parallel data and then performs an FFT process for the received parallel data. That is, the FFT processor 124 transforms time domain symbols into frequency domain symbols. The frequency domain symbols are input to an equalizer 125. The equalizer 125 eliminates the channel effect from the input frequency domain symbols and then outputs the symbols from which the channel effect has been eliminated. The symbols output from the equalizer 125 are input to a PSC 126. The PSC 126 converts the input parallel symbols into serial symbols and then outputs the serial symbols. The symbols serially converted in the unit of N symbols are input to a decoder 127. The decoder 127 decodes the input symbols and then provides an output bit stream 128.

The above-described OFDM system can more efficiently use a transmission band in comparison with a single carrier modulation system. For this reason, the OFDM system is widely used for a broadband transmission system.

In terms of reception characteristics, the OFDM system is more robust to a frequency selective multipath fading channel in comparison with a single carrier transmission system. Because there are a frequency selective channel in a frequency band occupied by multiple subcarriers and a frequency nonselective channel in each subcarrier band in terms of input signal characteristics of a receiver, a channel can be easily compensated in a simple channel equalization process. In particular, the OFDM system copies a second half part of each OFDM symbol, attaches the copied part as a CP before the OFDM symbol, and transmits the OFDM symbol, thereby removing ISI from a previous symbol. Thus, the OFDM transmission scheme is robust to the multipath fading channel and is proper for broadband high-speed communication.

In a standard for digital broadcasting, the OFDM transmission scheme receives attention as a transmission scheme capable of ensuring high quality of reception and high-speed transmission and reception. Examples of broadcasting standards adopting the OFDM transmission scheme are DAB for European wireless radio broadcasting, Digital Video Broadcasting-Terrestrial (DVB-T) serving as a terrestrial High Definition Television (HDTV) standard, and the like. Recently, a mobile broadcasting system is being developed in line with the global trend towards the convergence of broadcasting and communications. In particular, a major object of the mobile broadcasting system is to transmit a large amount of multimedia information. In Europe, DVB-Handheld (DVB-H) developed from DVB-T has been adopted as the mobile broadcasting standard. In South Korea, terrestrial Digital Multimedia Broadcasting (DMB) developed from DAB has been adopted as the broadcasting standard along with European DVB-H. MediaFLO proposed by Qualcomm is also based on the OFDM transmission scheme.

When a reception stage receives a signal modulated and transmitted by a transmission stage and converts the received signal into a baseband signal, synchronization between a transmission frequency and a reception frequency may not be acquired due to a tuner characteristic difference between the transmission stage and the reception stage. Herein, a frequency difference is referred to as a frequency offset.

Because this frequency offset leads to a decrease in signal magnitude and interference between adjacent channels, its correction is important to determine the performance of the OFDM system.

To correct the frequency offset in the OFDM scheme, many algorithms have been proposed. Synchronization algorithms for the OFDM system are divided into a carrier frequency synchronization algorithm and a symbol timing synchronization algorithm. The carrier frequency synchronization algorithm performs a function for correcting a carrier frequency offset between a transmitter and a receiver. The carrier frequency offset is caused by an oscillator frequency difference between the transmitter and the receiver, and a Doppler frequency offset. The carrier frequency offset of a signal input to a reception stage may be more than a subcarrier interval. A process for correcting an associated carrier frequency offset corresponding to an integer multiple of the subcarrier interval is defined as "initial carrier frequency synchronization." A process for correcting an associated carrier frequency offset corresponding to a decimal multiple of the subcarrier interval is defined as "fine carrier frequency synchronization. A transmitted OFDM signal is shifted by an integer multiple of a subcarrier unit in a frequency domain due to an offset corresponding to an integer multiple of a subcarrier unit and therefore an FFT output sequence is shifted by the integer multiple of the subcarrier unit.

On the other hand, the carrier frequency offset corresponding to the decimal multiple of the subcarrier leads to interference between FFT outputs and significant degradation of Bit Error Rate (BER) performance. In general, it is known that the OFDM system has a larger amount of performance degradation due to the carrier frequency offset in comparison with the single carrier transmission system.

Existing initial carrier frequency synchronization algorithms for the OFDM system can be divided into a blind detection algorithm and an algorithm using a predefined symbol. In an example of the blind detection algorithm, a shift amount of a signal band is estimated using a guard band. However, it is difficult to actually implement the blind detection algorithm because performance degradation is very large under a multipath fading channel environment. On the other hand, the algorithm using the predefined symbol is disadvantageous in that a data transmission rate is reduced because the predefined symbol is transmitted independent of a data symbol. However, the algorithm using the predefined symbol is widely used for many OFDM systems because the performances of synchronization and channel estimation are improved.

In general, the predefined symbol transmitted for synchronization and channel estimation of the reception stage is constructed with a sequence capable of using autocorrelation characteristics like a Pseudo Noise (PN) sequence. FIG. 2 illustrates a sequence offset related to autocorrelation characteristics of a Phase Reference Symbol (PRS) serving as a predefined symbol used in a DAB system. When an offset of a conventional PN sequence is 0, a maximal autocorrelation value is provided. In the other case, the autocorrelation value is very small. However, in the case of the PRS of FIG. 2, it can be seen that a significantly large side peak occurs. In other offsets, a very small autocorrelation value appears.

As the initial carrier frequency synchronization algorithm using the predefined symbol, algorithms proposed by Nogami and Taura are well known. The algorithm proposed by Nogami is illustrated in FIGS. 3A and 3B.

First, a PN detector 320 detects an autocorrelation value of a PN sequence in a frequency domain during a predefined symbol. After the PN detector 320 detects the autocorrelation value of the PN sequence, a magnitude generator 330 performs a square operation on an absolute value and inputs a metric value $Z_n$ for a frequency offset to a maximal value-related index generator 350.

The metric value $Z_n$ is expressed as shown in Equation (1).

$$Z_n(f_n) = \left| \sum_k Y[k] p^*[k - f_n] \right|^2 \quad (1)$$

Herein, Y[k] is a k-th FFT output result for an OFDM symbol in a PRS position, $f_n$ is an integer multiple of a carrier frequency offset estimate, $p[k-f_n]$ is a local PRS of a receiver with respect to $f_n$, and $p^*[k-f_n]$ is a complex conjugate of p[k−$f_n$]. The maximal value-related index generator 350 estimates a frequency deviation value as an initial carrier frequency offset when an autocorrelation value is maximal.

Because the algorithm proposed by Nogami as illustrated in FIG. 3A is very sensitive to a symbol timing offset, an additional algorithm has been proposed which can reduce sensitivity to the symbol timing offset by decreasing an autocorrelation length and increasing a noncoherent combining length as illustrated in FIG. 3B.

Referring to FIG. 3B, a PN detector 320 detects an autocorrelation value of a PN sequence in a frequency domain during a predefined symbol. After the PN detector 320 detects the autocorrelation value of the PN sequence, a magnitude generator 330 performs a square operation on an absolute value. A second accumulator 340 accumulates an output of the magnitude generator 330 and inputs a metric value $Z_n$ to a maximal value-related index generator 350.

The metric value $Z_n$ is expressed as shown in Equation (2).

$$Z_n(f_n) = \sum_m |R[m]|^2 \quad (2)$$

$$R[m] = \sum_{k=mN_1}^{(m+1)N_1 - 1} Y[k]p^*[k - f_n],$$

$$m = 0, 1, 2, \ldots$$

Herein, Y[k] is a k-th FFT output result for an OFDM symbol in a PRS position, $f_n$ is an integer multiple of a carrier frequency offset estimate, p[k−$f_n$] is a local PRS of a receiver with respect to $f_n$, x* is a complex conjugate of x, and $N_1$ is an accumulation length of a first accumulator. The maximal value-related index generator 350 estimates a frequency deviation value as an initial carrier frequency offset when an autocorrelation value is maximal.

On the other hand, the algorithm proposed by Taura corrects a PN sequence in a frequency domain, transforms the frequency domain sequence into a time domain sequence, and estimates a frequency shift amount mapped to a maximal value as an initial carrier frequency offset. This algorithm is significantly robust to a symbol timing offset, but requires very high hardware complexity because an IFFT process should be performed to compute every frequency offset estimate.

Among the conventional initial carrier frequency synchronization technologies in an OFDM receiver, the algorithm proposed by Nogami is difficult to be applied because autocorrelation characteristics are degraded when an FFT timing offset is large in a reception stage. That is, the FFT timing offset leads to linear phase rotation in the frequency domain. Thus, an autocorrelation length is reduced due to a limitation in the number of subcarriers capable of taking autocorrelation. As the autocorrelation length decreases, an autocorrelation value decreases and detection performance is degraded even though noncoherent combining is performed because distortion easily occurs due to a noise component. If an offset value is very large although FFT timing is detected, it can be seen that the performance of initial carrier frequency synchronization acquisition is significantly degraded in Nogami's algorithm.

On the other hand, when the FFT timing offset of the reception stage is small and interference from a previous symbol is absent under a multipath channel environment, only multipath components with a relatively small timing offset provide a large autocorrelation value and only multipath components with a relatively large timing offset provide a small autocorrelation value. In a Single Frequency Network (SFN) and a multipath channel environment with large channel delay spread, an amount of performance degradation further increases in Nogami's algorithm.

Among the conventional initial carrier frequency synchronization technologies in the OFDM receiver, the algorithm proposed by Taura can detect a predefined symbol even when an FFT timing offset is large, but has a disadvantage in that an IFFT process with very high hardware complexity should be used for processing in the time domain. In particular, the algorithm proposed by Taura is difficult to be used when a frequency offset is large because the IFFT process should be performed for one frequency estimate. Because only a multipath component with a largest magnitude value is used after transformation into the time domain, the number of multiple paths increases. There is a disadvantage in that performance is significantly degraded when the magnitudes of multipath components are similar to each other.

Accordingly, there is a need for an improved apparatus and method for carrier frequency synchronization in an OFDM system that sustains performance in the presence of multipath interference.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for carrier frequency synchronization that can improve the performance of initial carrier frequency offset detection and the degradation of autocorrelation characteristics in an environment where an Fast Fourier Transform (FFT) timing offset of a reception stage is large in a wireless communication system based on Orthogonal Frequency Division Multiplexing (OFDM).

It is another aspect of exemplary embodiments of the present invention to provide an apparatus and method for carrier frequency synchronization that can obtain autocorrelation characteristics by sufficiently employing all multipath components even under a Single Frequency Network (SFN) environment and a multipath channel environment where channel delay spread is large in a wireless communication system based on OFDM.

It is another aspect of exemplary embodiments of the present invention to provide an apparatus and method for carrier frequency synchronization in a wireless communication system based on OFDM that can further reduce hardware complexity by processing a signal in a frequency domain in comparison with a conventional system having high hardware complexity.

It is yet another aspect of exemplary embodiments of the present invention to provide an apparatus and method for carrier frequency synchronization that can be robust to a symbol timing offset and a multipath channel environment while employing a simple hardware structure in a wireless communication system based on OFDM.

In accordance with an aspect of exemplary embodiments of the present invention, there is provided an apparatus for carrier frequency synchronization in an Orthogonal Frequency Division Multiplexing (OFDM) system, in which, a metric generator for frequency estimation performs a first accumulation process for a value computed by multiplying a Phase Reference Symbol (PRS) generated from a reception stage by a Fast Fourier Transform (FFT) output signal for an OFDM symbol in a PRS position within a predefined frame, acquires a differential symbol from a product of adjacent FFT output symbols, performs a second accumulation process for a real part extracted from the differential symbol, and outputs a metric value for the frequency estimation; and a maximal value-related index generator compares metric values for initial frequency estimation within a predetermined frequency offset estimation range, and selects and outputs a maximal metric value as a frequency offset estimate.

In accordance with another aspect of exemplary embodiments of the present invention, there is provided an apparatus for carrier frequency synchronization in an Orthogonal Frequency Division Multiplexing (OFDM) system, in which, a metric generator for frequency estimation performs a first accumulation process for a value computed by multiplying a Phase Reference Symbol (PRS) generated from a reception stage by a Fast Fourier Transform (FFT) output signal for an OFDM symbol in a PRS position within a predefined frame, acquires a differential symbol from a product of adjacent FFT output symbols, performs a second accumulation process for a real part extracted from the differential symbol, and outputs a metric value for the frequency estimation; and a threshold comparator determines whether metric values for initial frequency estimation exceed a specific threshold, and selects and outputs a metric value exceeding the specific threshold as a frequency offset estimate.

In accordance with another aspect of exemplary embodiments of the present invention, there is provided a method for carrier frequency synchronization in an Orthogonal Frequency Division Multiplexing (OFDM) system, in which, a first accumulation process is performed for a value computed by multiplying a Phase Reference Symbol (PRS) generated from a reception stage by a Fast Fourier Transform (FFT) output signal for an OFDM symbol in a PRS position within a predefined frame; a differential symbol is acquired from a product of adjacent FFT output symbols, a second accumulation process for a real part extracted from the differential symbol is performed, and a metric value for frequency estimation is output; and metric values for initial frequency estimation within a predetermined frequency offset estimation range and selecting and outputting a maximal metric value as a frequency offset estimate are compared.

In accordance with another aspect of exemplary embodiments of the present invention, there is provided a method for carrier frequency synchronization in an Orthogonal Frequency Division Multiplexing (OFDM) system, in which, a first accumulation process is performed for a value computed by multiplying a Phase Reference Symbol (PRS) generated from a reception stage by a Fast Fourier Transform (FFT) output signal for an OFDM symbol in a PRS position within a predefined frame; a differential symbol from a product of adjacent FFT output symbols is acquired, a second accumulation process for a real part extracted from the differential symbol is performed, and a metric value for frequency estimation is output; and whether metric values for initial frequency estimation exceed a specific threshold are determined, and a metric value exceeding the specific threshold as a frequency offset estimate is selected and output.

In accordance with yet another aspect of exemplary embodiments of the present invention, there is provided a method for carrier frequency synchronization in an Orthogonal Frequency Division Multiplexing (OFDM) system, in which, a first accumulation process is performed for a value computed by multiplying a Phase Reference Symbol (PRS) generated from a reception stage by a Fast Fourier Transform (FFT) output signal for an OFDM symbol in a PRS position within a predefined frame, a differential symbol from a product of adjacent FFT output symbols is acquired, a second accumulation process for a real part extracted from the differential symbol is performed, and a metric value for frequency estimation is output; whether a frequency index related to the metric value for the frequency estimation is last is determined; and a frequency index, having a maximal value of metric values stored in frequency indices, is selected and output as a frequency offset estimate when the related frequency index is determined to be last.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 4A:
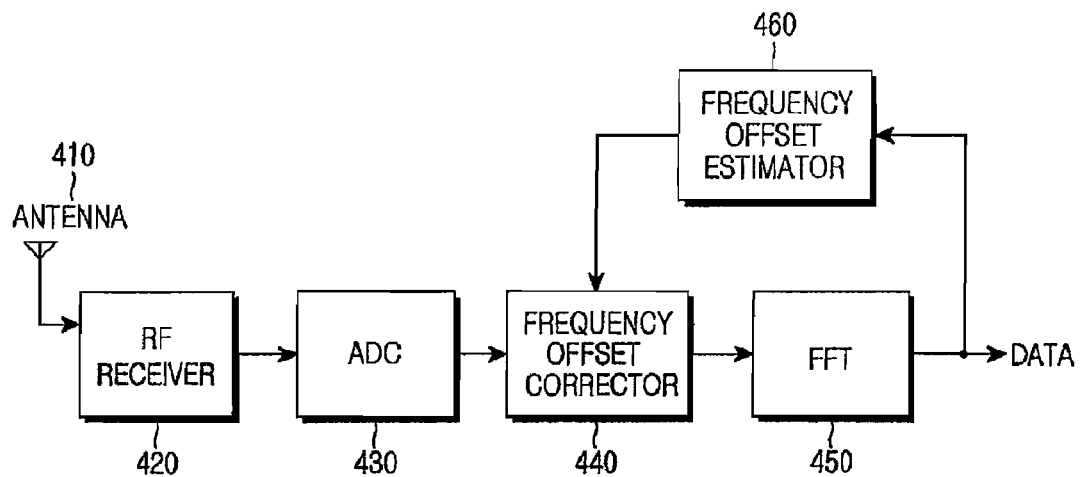
FIGS. 4A and 4B illustrate correction in a digital domain and correction in an analog domain for use in an initial carrier frequency offset estimator in an OFDM system.
Figure 4B:
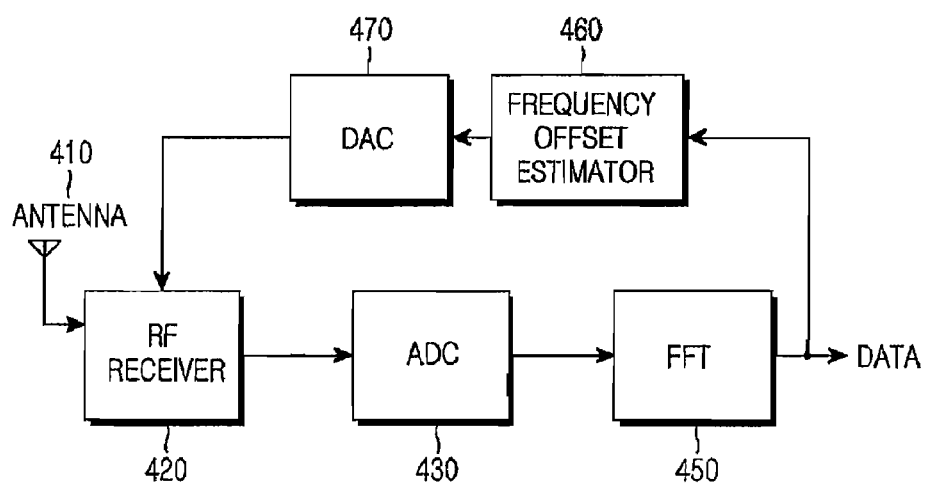

In an Orthogonal Frequency Division Multiplexing (OFDM) system, operations of an initial carrier frequency estimator can be divided into a case where correction is made in a digital domain as illustrated in FIG. 4A and a case where correction is made in an analog domain as illustrated in FIG. 4B.

Referring to FIG. 4A, a Radio Frequency (RF) receiver 420 converts an OFDM signal received through an antenna 410 into a baseband signal and then outputs the baseband signal to an Analog-to-Digital Converter (ADC) 430.

The ADC 430 receives an analog signal transformed into a time domain through Inverse Fast Fourier Transform (IFFT) of a transmitter and then converts the received analog signal into a digital signal. The ADC 430 outputs the digital signal to a frequency offset corrector 440.

The frequency offset corrector 440 corrects a frequency offset of received data caused by a tuner characteristic difference on the basis of a frequency offset estimate output from a frequency offset estimator 460 as described below.

A Fast Fourier Transform (FFT) processor 450 transforms the received time domain data into a frequency domain.

The frequency offset estimator 460 estimates the frequency offset using a signal transformed into the frequency domain in the FFT processor 450. The frequency offset corrector 440 compensates for the estimated frequency offset.

On the other hand, in FIG. 4B, the carrier frequency offset estimator 460 estimates a frequency offset using a signal transformed into the frequency domain in the FFT processor 450 for correction in an analog domain. A Digital-to-Analog Converter (DAC) 470 converts the estimated frequency offset into an analog signal and then outputs the analog signal to the RF receiver 420. The RF receiver 420 corrects the carrier frequency offset using a mixer (not illustrated) by adjusting a frequency of an oscillator. In an exemplary implementation, it is assumed that the OFDM system transmits a predefined symbol for initial carrier frequency synchronization. Examples of the OFDM system for transmitting the predefined symbol are Digital Audio Broadcasting (DAB) serving as a European digital audio broadcasting standard, Digital Video Broadcasting-Terrestrial (DVB-T) and DVB-Handheld (DVB-H) serving as European digital video broadcasting standards, and the like. The DAB system transmits a predefined symbol called a Phase Reference Symbol (PRS) and the DVB-T or DVB-H system transmits a predefined symbol called a Pseudo-Random Binary Sequence (PRBS) on a pilot carrier. The above-described OFDM system transmits a sequence in which autocorrelation characteristics are superior in all frequency domains using a subcarrier or pilot carrier. A frame structure of an exemplary embodiment of the present invention will be described with reference to the DAB system. However, it should be noted that the present invention is applicable to any OFDM system in which a predefined symbol capable of using autocorrelation characteristics is transmitted.

Figure 5:
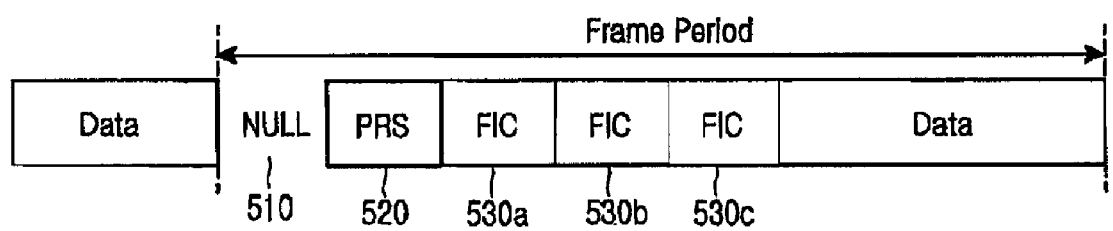
FIG. 5 illustrates a frame structure of a DAB system.

FIG. 5 illustrates a frame structure of a DAB system.

Figure 1:
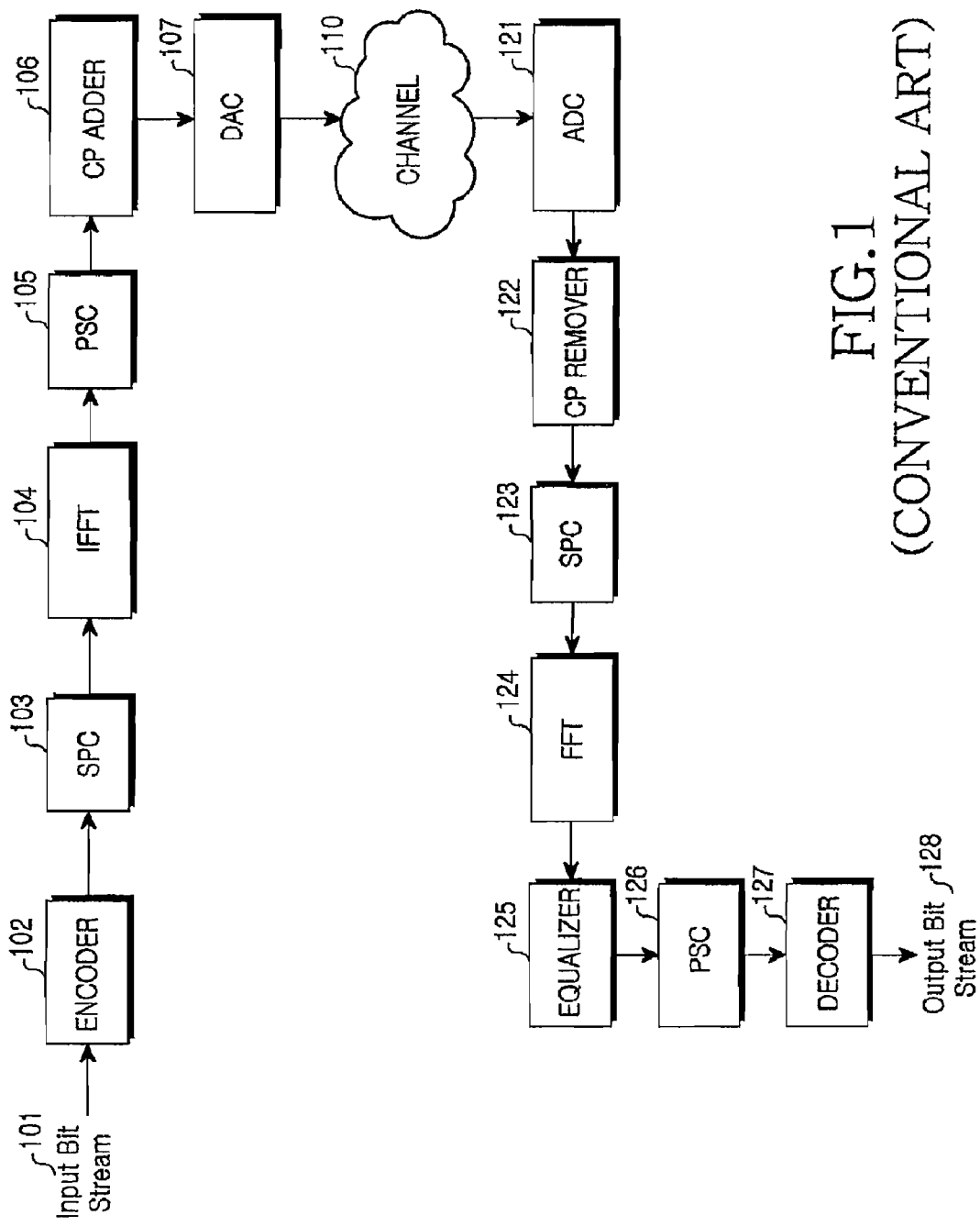
FIG. 1 is a block diagram illustrating physical layers for transmission and reception in a conventional Orthogonal Frequency Division Multiplexing (OFDM) system.
Figure 2:
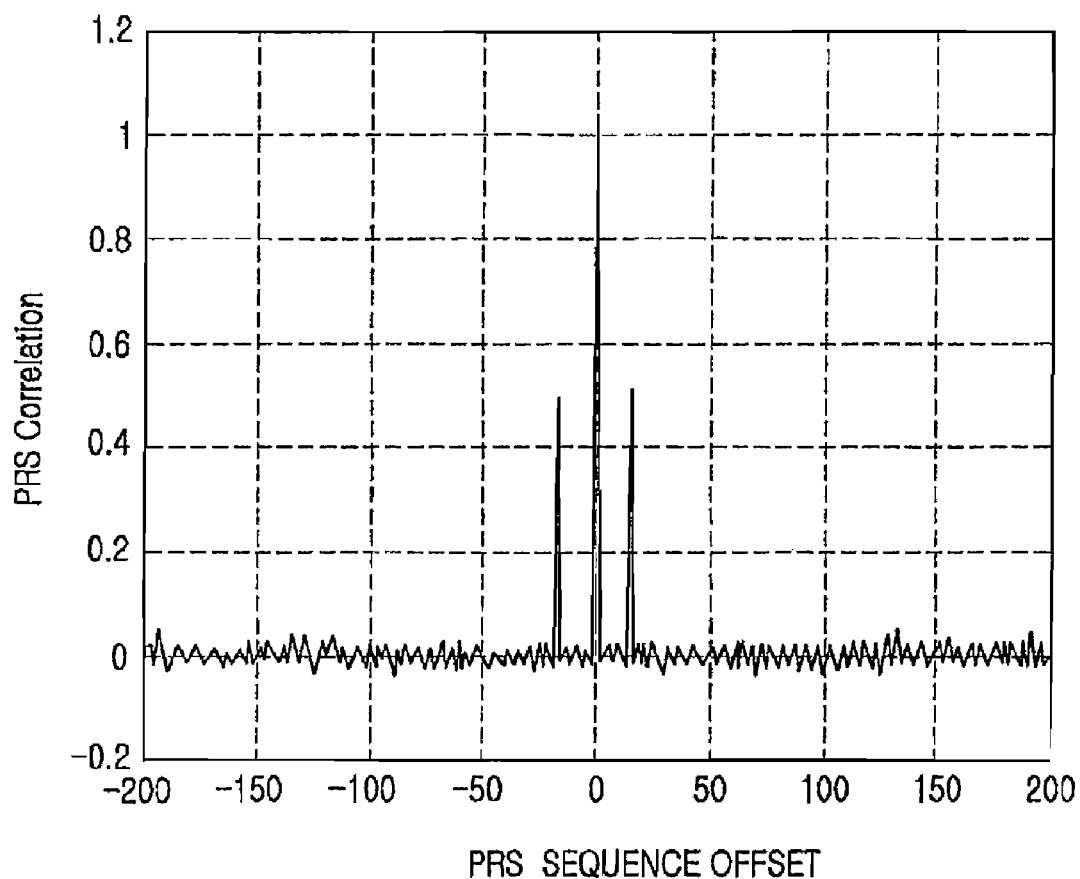
FIG. 2 illustrates a sequence offset related to autocorrelation characteristics of a Phase Reference Symbol (PRS) serving as a predefined symbol used in a Digital Audio Broadcasting (DAB) system.
Figure 3A:
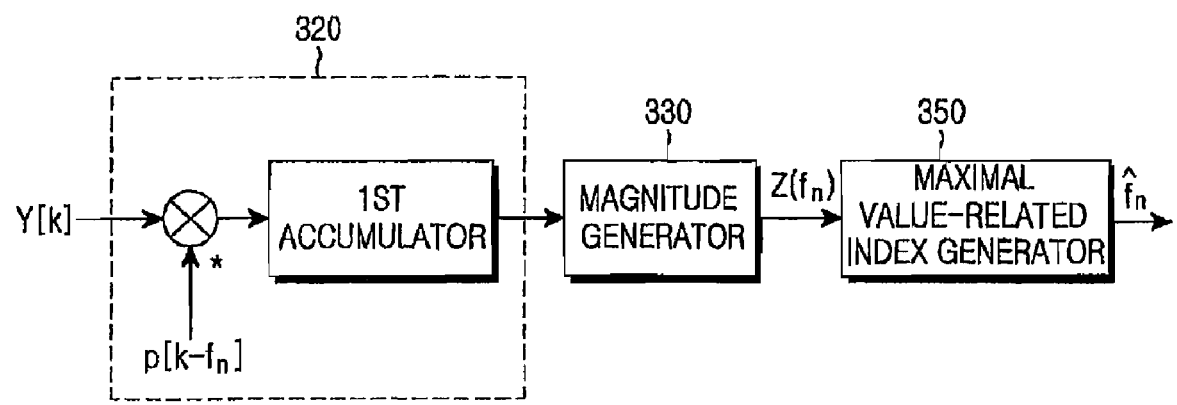
FIGS. 3A and 3B illustrate conventional methods for initial carrier frequency synchronization using a predefined symbol.
Figure 3B:
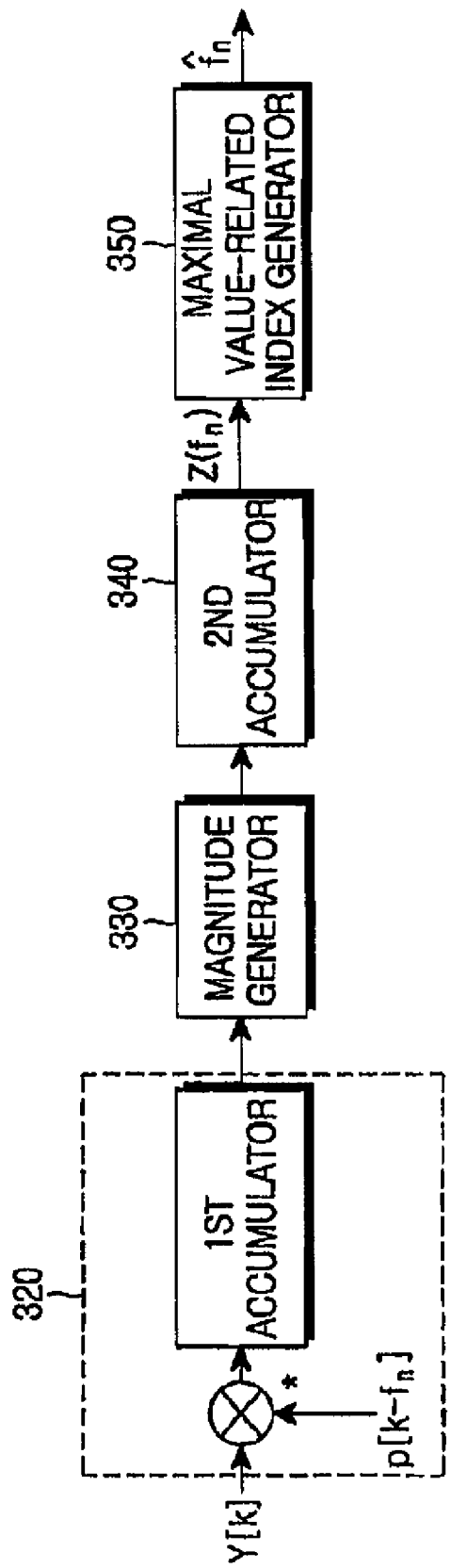

For symbol and carrier synchronization processes, a NULL symbol 510 and a PRS 520 are included and transmitted. After a synchronization symbol, Fast Information Channels (FICs) 530a~530c for providing a control signal are transmitted and subsequently a Main Service Channel (MSC) serving as a data channel is transmitted. A predefined symbol to be used in the DAB system is the PRS 520. A predefined sequence is transmitted on every subcarrier of a frequency domain. In autocorrelation characteristics of the sequence, an autocorrelation value is large when a phase difference of the sequence is 0 and the autocorrelation value is small when the phase difference of the sequence is not 0 as illustrated in FIG. 2.

In a synchronization process of the DAB system, frame synchronization is performed by detecting the NULL symbol 510. In this process, a position of an OFDM symbol is roughly detected. The PRS 520 to be transmitted after the NULL symbol 510 is the predefined symbol and can be used for initial carrier frequency synchronization, symbol timing synchronization, and the like. In an exemplary implementation, the initial carrier frequency synchronization uses autocorrelation characteristics of a superior PRS as illustrated in FIG. 2 and uses the fact that a phase difference of the predefined sequence to be transmitted in the PRS is proportional to a frequency offset. That is, a phase difference of a sequence with a maximal autocorrelation value is estimated as a frequency offset corresponding to an integer multiple of a subcarrier interval.

Figure 6:
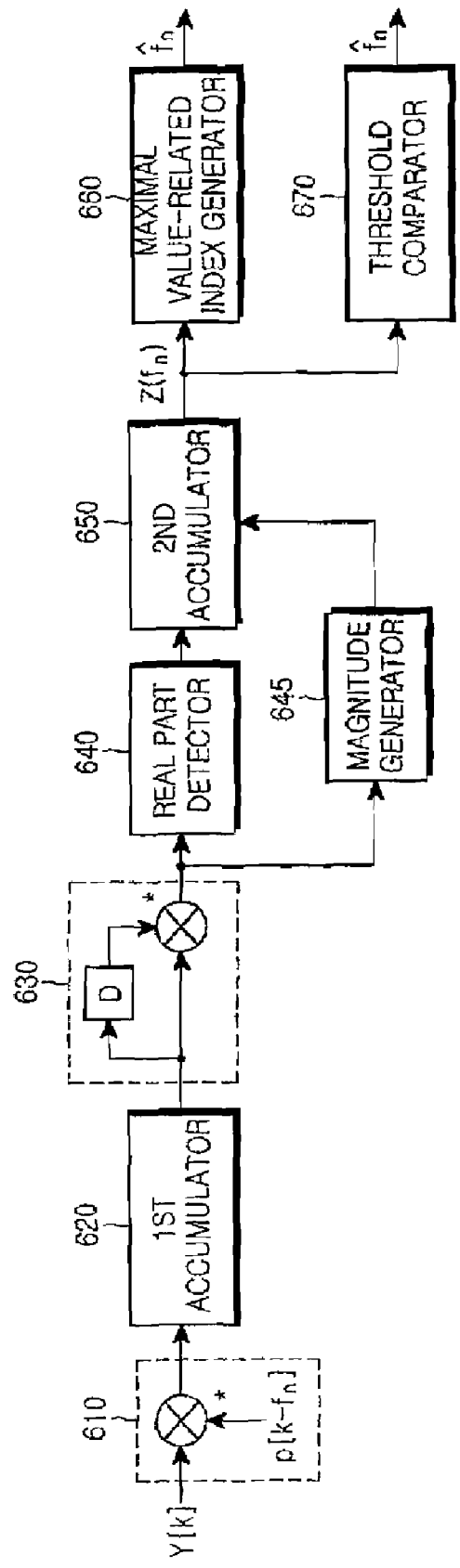
FIG. 6 is a schematic diagram illustrating initial carrier frequency estimators in an OFDM system in accordance with exemplary embodiments of the present invention.

FIG. 6 is a schematic diagram illustrating an initial carrier frequency estimator in an OFDM system in accordance with an exemplary embodiment of the present invention.

The OFDM system is provided with a memory (not illustrated), a Pseudo Noise (PN) detector 610, a first accumulator 620, a differential symbol detector 630, a real part detector 640, a second accumulator 650, and a maximal value-related index generator 660. Herein, the PN detector 610, the first accumulator 620, the differential symbol detector 630, the real part detector 640, and the second accumulator are defined as a metric generator for frequency estimation. As illustrated in FIG. 6, a threshold comparator 670 can be provided in place of the maximal value-related index generator 660. An FFT output signal value is linearly rotated by a timing offset capable of being caused in an FFT process for a received signal. Therefore, when simple autocorrelation is taken, an autocorrelation value is reduced in proportion to a symbol timing offset. The reduction of the autocorrelation value leads to the degradation of frequency offset detection performance. An exemplary embodiment of the present invention provides a scheme using a differential symbol because the degree of phase rotation caused by a symbol timing offset between adjacent subcarriers is very small.

In the initial carrier frequency estimator of the OFDM system in accordance with an exemplary embodiment of the present invention, the memory stores a result obtained by receiving an OFDM symbol in a position of the predefined symbol and performing an FFT process for the received OFDM symbol. The PN detector 610 receives an FFT output signal in the PRS position within a frame and eliminates the effect of data modulation with a PRS element multiplied by the PRS generated from a reception stage. The first accumulator 620 receives and accumulates an output of the PN detector 610 and then provides an output of the first accumulator 620 to the differential symbol detector 630. The differential symbol detector 630 acquires a differential symbol from a product of adjacent FFT output symbols. As an accumulation interval increases in the first accumulator 620, the quality of an input signal of the differential symbol detector 630 is improved and the performance of detection is improved even in an environment with a very low Signal-to-Noise Ratio (SNR). However, when a symbol timing offset is present, the performance is reduced as the accumulation interval increases. Thus, it is important to detect an optimal accumulation interval. It should be noted that the first accumulator 620 is not required in some cases. For example, an accumulation length used in the present invention is set to a smaller value in comparison with that of the conventional technology, such that the present invention can reduce the degradation of performance due to the symbol timing offset. When a value of a differentially detected symbol is a complex number, a value of a real part is more than that of an imaginary part and the real part has a greater amount than the imaginary part. Thus, the real part detector 640 extracts the real part of the differential symbol and the second accumulator 650 accumulates an output of the real part detector 640, thereby obtaining performance improvement. Thus, a metric value $Z(f_n)$ for a frequency offset is expressed as shown in Equation (3).

$$Z(f_n) = \text{Re}\left[\sum_m R[m]R^*[m+1]\right] \quad (3)$$

$$R[m] = \sum_{k=mN_1}^{(m+1)N_1-1} Y[k]p^*[k-f_n],$$

$$m = 0, 1, 2, \ldots$$

Herein, Y[k] is a k-th FFT output result for an OFDM symbol in a PRS position, $f_n$ is an integer multiple of a carrier frequency offset estimate, $p[k-f_n]$ is a local PRS of a receiver with respect to $f_n$, x* is a complex conjugate of x, and $N_1$ is an accumulation length of the first accumulator 620. On the other hand, when the symbol timing offset is more than the accumulation length of the first accumulator 620, the magnitude of the real part of the differential symbol is not more than that of the imaginary part. In this case, a magnitude generator 645 inputs a magnitude component of the differential symbol to the second accumulator 650 as illustrated in FIG. 6. Thus, a metric value $Z(f_n)$ for a frequency offset is expressed as shown in Equation (4).

$$Z(f_n) = \left|\sum_m R[m]R^*[m+1]\right|^p \quad (4)$$

$$R[m] = \sum_{k=mN_1}^{(m+1)N_1-1} Y[k]p^*[k-f_n],$$

$$m = 0, 1, 2, \ldots$$

Herein, p is an integer more than 0, Y[k] is a k-th FFT output result for an OFDM symbol in a PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a conjugate of $R[m+1]$, and $N_1$ is an accumulation length of the first accumulator 620.

Equations (3) and (4) indicate the metric value for the integer multiple of the carrier frequency offset estimate $f_n$, respectively. Consequently, the maximal value-related index generator 660 compares metric values within a predetermined frequency offset estimation range, and selects a frequency offset estimate mapped to a maximal metric value as a carrier frequency offset value. Thus, an output of the maximal value-related index generator 660 can be expressed as shown in Equation (5).

$$\hat{f}_n = \arg\left[\max_{f_n}[Z(f_n)]\right] \quad (5)$$

On the other hand, the maximal value-related index detector 660 of Equation (5) can be replaced with the threshold comparator 670. The threshold comparator 670 determines whether the metric value computed by Equation (3) or (4) exceeds a specific threshold with respect to the carrier frequency offset estimate $f_n$. If the metric value exceeds the threshold value, an associated carrier frequency offset estimate is set to an integer multiple of a carrier frequency offset value.

Figure 7:
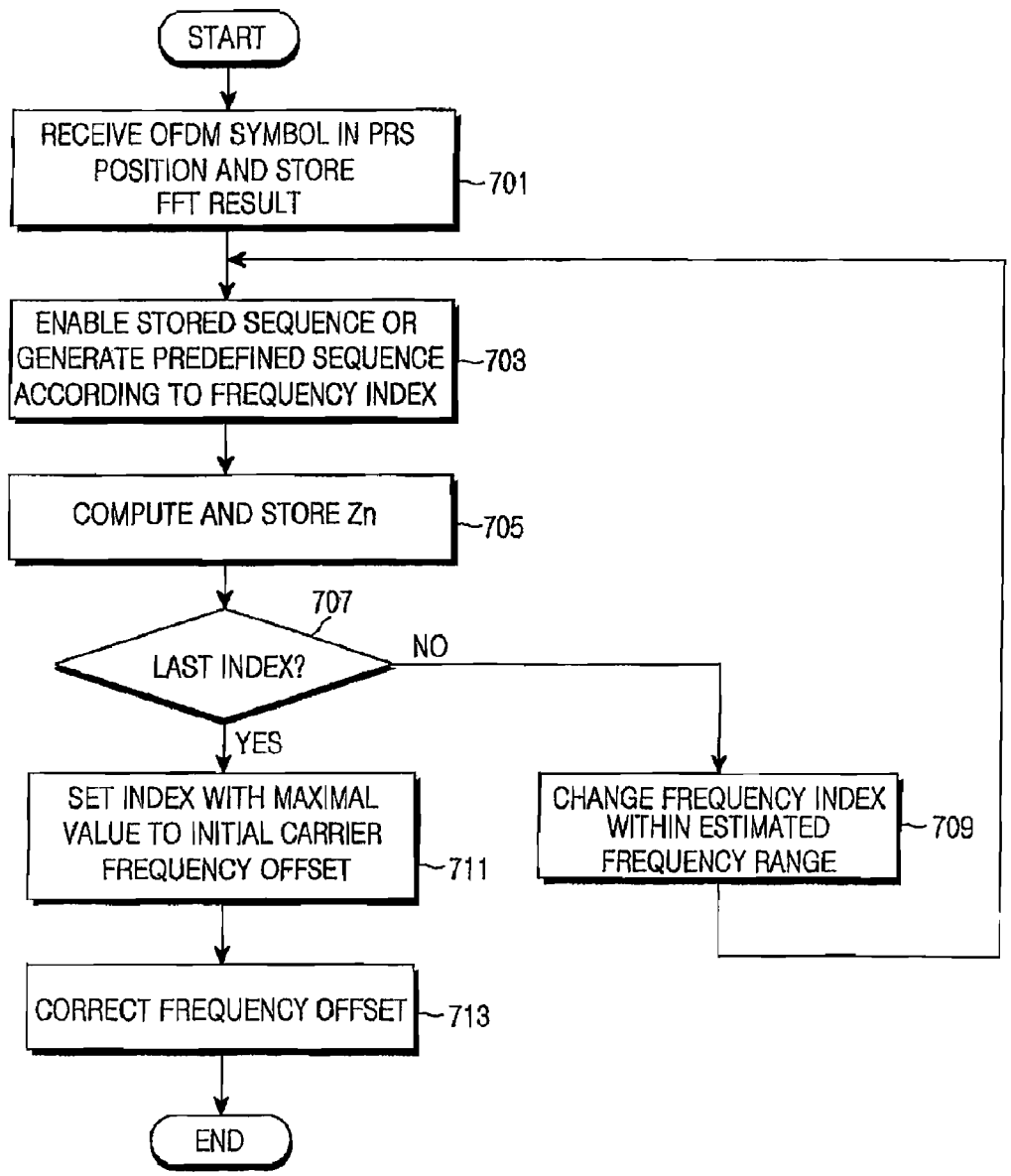
FIG. 7 is a flowchart illustrating an initial carrier frequency synchronization method in the OFDM system in accordance with an exemplary embodiment of the present invention.

A carrier frequency synchronization method in a wireless communication system based on OFDM in accordance with an exemplary embodiment of the present invention will be described with reference to FIG. 7. FIG. 7 is a flowchart illustrating a frequency offset detection method for selecting a maximal value as shown in Equation (5).

In step 701, the memory stores a result obtained by receiving an OFDM symbol in a position of a predefined symbol and performing an FFT process for the received OFDM symbol. In step 703, the frequency offset estimator 460 enables a stored sequence or generates a predefined sequence on the basis of a frequency index using a generator.

In step 705, the frequency offset estimator 460 computes a metric value $Z_n$ for initial frequency estimation as described with reference to FIG. 6. In step 707, the maximal value-related index generator 660 determines whether an index range to be checked using $Z_n$ ends. If a checked index is not last, the maximal value-related index generator 660 changes a frequency index within an estimated frequency range in step 709. However, if the checked index is last, the maximal value-related index generator 660 sets a frequency index with a maximal value of $Z_n$ values stored in frequency indices to an initial carrier frequency offset value and then outputs the initial carrier frequency offset value in step 711.

In step 713, the frequency offset corrector 440 corrects a frequency offset estimated by the frequency offset estimator 460.

Figure 8:
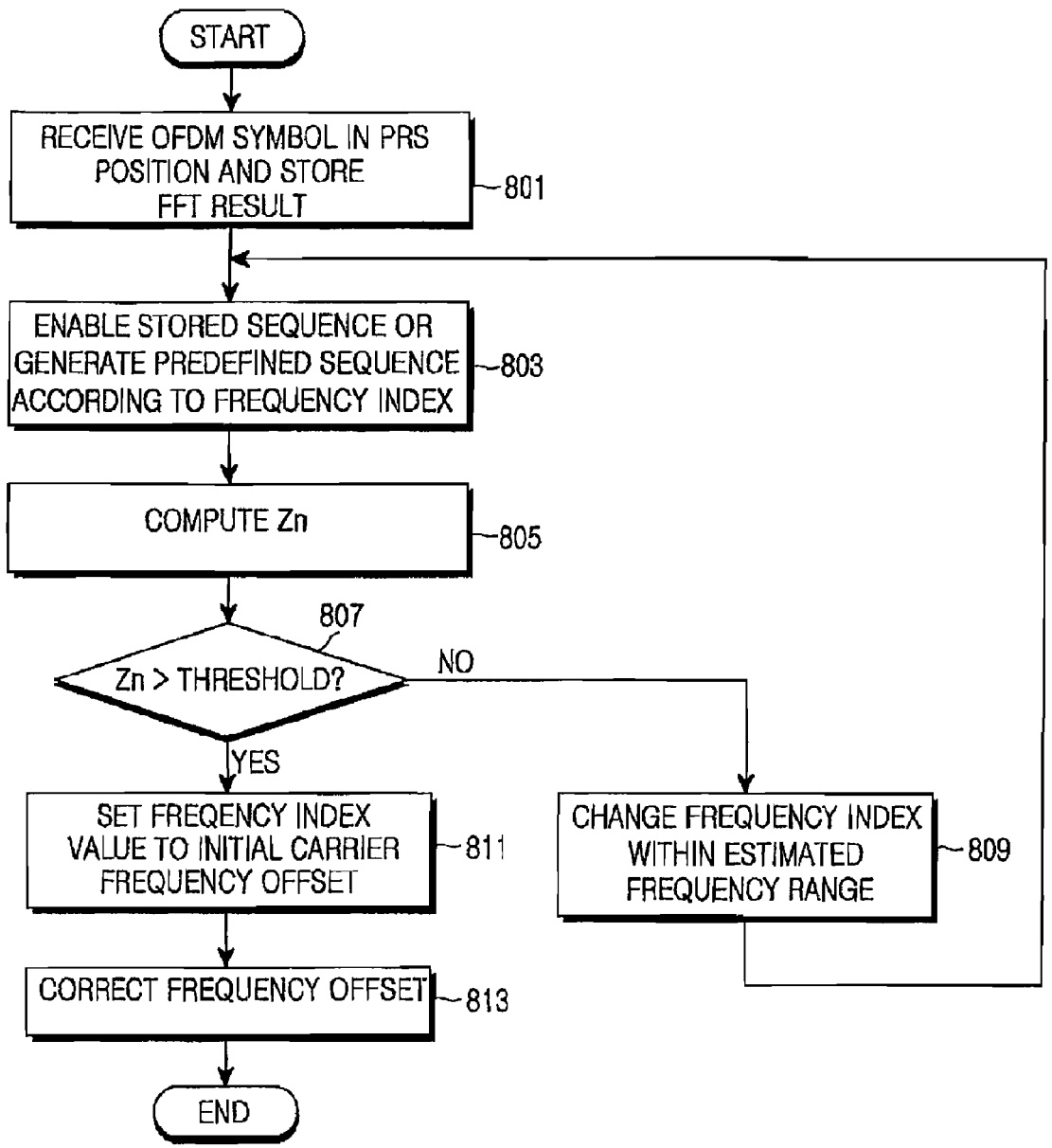
FIG. 8 is a flowchart illustrating an initial carrier frequency synchronization method in the OFDM system in accordance with an exemplary embodiment of the present invention.

A carrier frequency synchronization method in a wireless communication system based on OFDM in accordance with an exemplary embodiment of the present invention will be described with reference to FIG. 8. FIG. 8 is a flowchart illustrating a frequency offset detection method based on a comparison with a threshold.

In step 801, the memory stores a result obtained by receiving an OFDM symbol in a position of a predefined symbol and performing an FFT process for the received OFDM symbol. In step 803, the frequency offset estimator 460 enables a stored sequence or generates a predefined sequence on the basis of a frequency index using a generator.

In step 805, the frequency offset estimator 460 computes a metric value $Z_n$ for initial frequency estimation as described with reference to FIG. 6. In step 807, the threshold comparator 670 determines whether $Z_n$ is more than a threshold. If $Z_n$ is less than or equal to the threshold, the threshold comparator 670 changes a frequency index within an estimated frequency range in step 809.

However, if $Z_n$ is more than a threshold, the threshold comparator 670 sets a value of an associated frequency index to an initial carrier frequency offset value and then outputs the initial carrier frequency offset value in step 811.

In step 813, the frequency offset corrector 440 corrects a frequency offset estimated by the frequency offset estimated 460.

Figure 9:
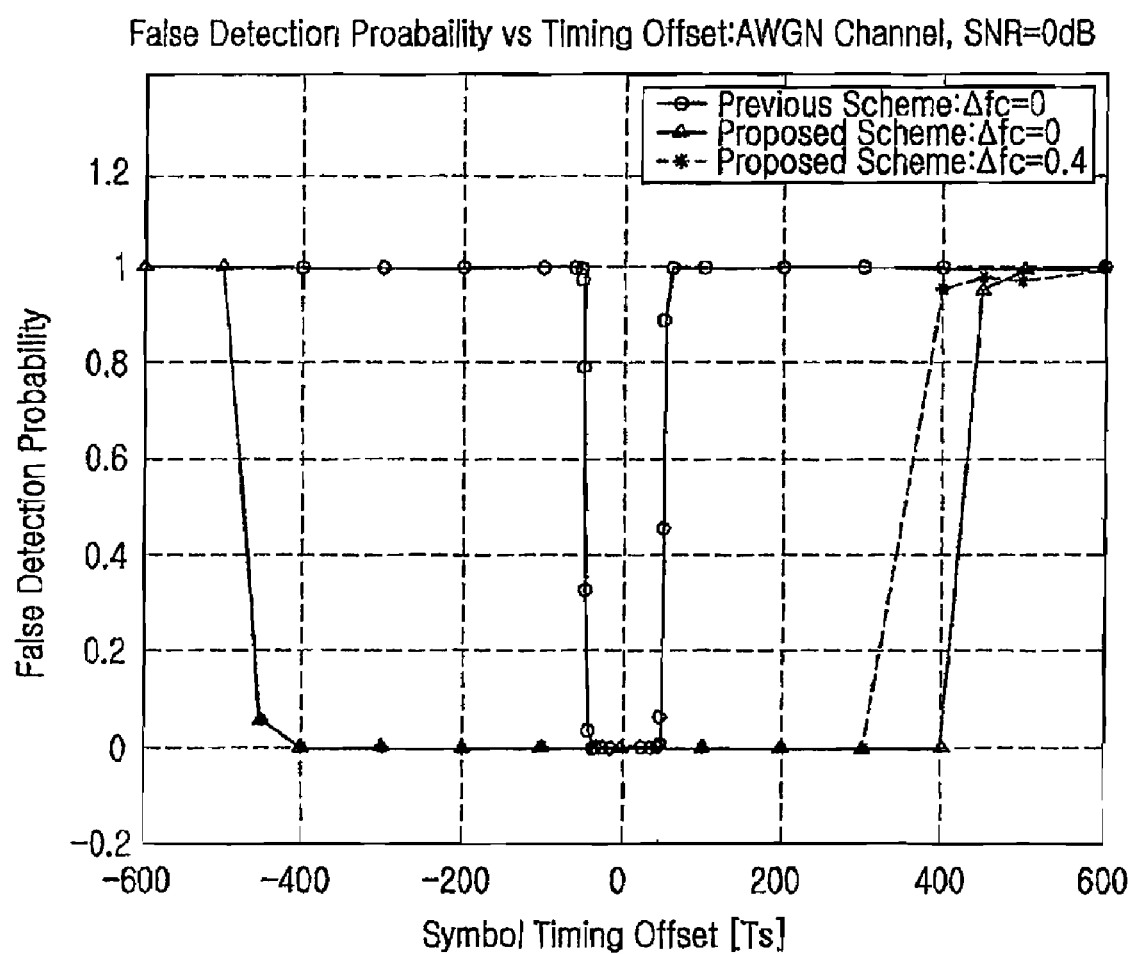
FIG. 9 is a graph illustrating a performance comparison between an exemplary embodiment of the present invention and the prior art.

FIG. 9 illustrates the performance of an exemplary embodiment of the present invention and the probability of false detection of a carrier frequency offset with respect to a symbol timing offset. FIG. 9 illustrates a performance comparison between a proposed scheme and a previous scheme. From FIG. 9, it can be seen that the proposed initial carrier frequency synchronization scheme can significantly improve the performance of initial carrier frequency offset detection by further improving the degradation of autocorrelation characteristics even in an environment where an FFT timing offset of a reception stage is large in comparison with the previous scheme. As is apparent from the above description, exemplary embodiments of the present invention have at least the following advantages.

Exemplary embodiments of the present invention can significantly improve the performance of initial carrier frequency offset detection by further improving the degradation of autocorrelation characteristics even in an environment where an FFT timing offset of a reception stage is large in comparison with the conventional method.

Exemplary embodiments of the present invention can employ a differential symbol detection structure and obtain autocorrelation characteristics by more sufficiently employing all multipath components even in a multipath channel environment where channel delay spread is large, thereby improving the performance of initial carrier frequency offset detection.

Exemplary embodiments of the present invention can further reduce hardware complexity by processing a signal in a frequency domain in comparison with a conventional system having high hardware complexity.

Conventionally, frame or timing synchronization is performed such that an FFT timing offset is sufficiently small. However, exemplary embodiments of the present invention can roughly perform frame and/or timing synchronization.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for carrier frequency synchronization in an Orthogonal Frequency Division Multiplexing (OFDM) system, the apparatus comprising:
a metric generator for frequency estimation for performing a first accumulation process for a value computed by multiplying a Phase Reference Symbol (PRS) generated from a reception stage by a Fast Fourier Transform (FFT) output signal for an OFDM symbol in a PRS position within a predefined frame, acquiring a differential symbol from a product of adjacent FFT output symbols, performing a second accumulation process for a real part extracted from the differential symbol, and outputting a metric value for the frequency estimation; and
a maximal value-related index generator for comparing metric values for initial frequency estimation within a frequency offset estimation range and selecting and outputting a maximal metric value as a frequency offset estimate.

2. The apparatus of claim 1, further comprising:
a frequency offset corrector for correcting a frequency offset of data received by the reception stage in accordance with the frequency offset estimate outputted from the maximal value-related index generator.

3. The apparatus of claim 1, wherein the metric generator for the frequency estimation comprises:
a Pseudo Noise (PN) detector for multiplying the PRS generated from the reception stage by the FFT output signal for the OFDM symbol in the PRS position within the predefined frame;
a first accumulator for performing the first accumulation process for an output of the PN detector;
a differential symbol detector for outputting the differential symbol using the product of the adjacent FFT output symbols;
a real part detector for extracting the real part from the differential symbol; and
a second accumulator for performing the second accumulation process for an output of the real part detector during a predetermined interval.

4. The apparatus of claim 1, wherein the metric generator for the frequency estimation comprises:
a Pseudo Noise (PN) detector for multiplying the PRS generated from the reception stage by the FFT output signal for the OFDM symbol in the PRS position within the predefined frame;
a first accumulator for performing the first accumulation process for an output of the PN detector;
a differential symbol detector for outputting the differential symbol using the product of the adjacent FFT output symbols;
a magnitude generator for extracting a magnitude component from the differential symbol; and
a second accumulator for performing the second accumulation process for an output of the magnitude generator.

5. The apparatus of claim 1, wherein the metric value for the frequency estimation is defined by:

$$Z(f_n) = \text{Re}\left[\sum_m R[m]R^*[m+1]\right] \text{ and}$$

$$R[m] = \sum_{k=mN_1}^{(m+1)N_1-1} Y[k]p^*[k-f_n],$$

$$m = 0, 1, 2, \ldots,$$

where Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of $R[m+1]$, and $N_1$ is an accumulation length of the first accumulation process.

6. The apparatus of claim 1, wherein the metric value for the frequency estimation is defined by:

$$Z(f_n) = \text{Re}\left|\sum_m R[m]R^*[m+1]\right|^p \text{ and}$$

$$R[m] = \sum_{k=mN_1}^{(m+1)N_1-1} Y[k]p^*[k-f_n],$$

$$m = 0, 1, 2, \ldots,$$

where p is an integer more than 0, Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of $R[m+1]$, and $N_1$ is an accumulation length of the first accumulation process.

7. The apparatus of claim 1, wherein the output of the maximal value-related index generator is defined by:

$$\hat{f}_n = \arg\left[\max_{f_n}[Z(f_n)]\right],$$

where $f_n$ is an integer multiple of a carrier frequency offset estimate and $Z(f_n)$ is the metric value for the frequency estimation.

8. The apparatus of claim 1, wherein the PRS is constructed with a Pseudo Noise (PN) sequence that uses autocorrelation characteristics.

9. An apparatus for carrier frequency synchronization in an Orthogonal Frequency Division Multiplexing (OFDM) system, the apparatus comprising:
- a metric generator for frequency estimation for performing a first accumulation process for a value computed by multiplying a Phase Reference Symbol (PRS) generated from a reception stage by a Fast Fourier Transform (FFT) output signal for an OFDM symbol in a PRS position within a predefined frame, acquiring a differential symbol from a product of adjacent FFT output symbols, performing a second accumulation process for a real part extracted from the differential symbol, and outputting a metric value for the frequency estimation; and
- a threshold comparator for determining whether the metric value for initial frequency estimation exceeds a threshold, and outputting the metric value as a frequency offset estimate when the metric value exceeds the threshold.

10. The apparatus of claim 9, further comprising:
- a frequency offset corrector for correcting a frequency offset of data received by the reception stage in accordance with the frequency offset estimate outputted from the threshold comparator.

11. The apparatus of claim 9, wherein the metric generator for the frequency estimation comprises:
- a Pseudo Noise (PN) detector for multiplying the PRS generated from the reception stage by the FFT output signal for the OFDM symbol in the PRS position within the predefined frame;
- a first accumulator for performing the first accumulation process for an output of the PN detector;
- a differential symbol detector for outputting the differential symbol using the product of the adjacent FFT output symbols;
- a real part detector for extracting the real part from the differential symbol; and
- a second accumulator for performing the second accumulation process for an output of the real part detector during a predetermined interval.

12. The apparatus of claim 9, wherein the metric generator for the frequency estimation comprises:
- a Pseudo Noise (PN) detector for multiplying the PRS generated from the reception stage by the FFT output signal for the OFDM symbol in the PRS position within the predefined frame;
- a first accumulator for performing the first accumulation process for an output of the PN detector;
- a differential symbol detector for outputting the differential symbol using the product of the adjacent FFT output symbols;
- a magnitude generator for extracting a magnitude component from the differential symbol; and
- a second accumulator for performing the second accumulation process for an output of the magnitude generator.

13. The apparatus of claim 9, wherein the metric value for the frequency estimation is defined by:

$$Z(f_n) = \operatorname{Re}\left[\sum_m R[m]R^*[m+1]\right] \text{ and }$$

$$R[m] = \sum_{k=mN_1}^{(m+1)N_1 - 1} Y[k]p^*[k - f_n],$$

$$m = 0, 1, 2, \ldots,$$

where Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of R[m+1], and $N_1$ is an accumulation length of the first accumulation process.

14. The apparatus of claim 9, wherein the metric value for the frequency estimation is defined by:

$$Z(f_n) = \operatorname{Re}\left|\sum_m R[m]R^*[m+1]\right|^p \text{ and}$$

$$R[m] = \sum_{k=mN_1}^{(m+1)N_1 - 1} Y[k]p^*[k - f_n],$$

$$m = 0, 1, 2, \ldots,$$

where p is an integer more than 0, Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of R[m+1], and $N_1$ is an accumulation length of the first accumulation process.

15. The apparatus of claim 9, wherein the PRS is constructed with a Pseudo Noise (PN) sequence that uses autocorrelation characteristics.

16. A method for carrier frequency synchronization by a carrier frequency synchronization apparatus in an Orthogonal Frequency Division Multiplexing (OFDM) system, the method comprising:
- performing, by the carrier frequency synchronization apparatus, a first accumulation process for a value computed by multiplying a Phase Reference Symbol (PRS) generated from a reception stage by a Fast Fourier Transform (FFT) output signal for an OFDM symbol in a PRS position within a predefined frame;
- acquiring, by the carrier frequency synchronization apparatus, a differential symbol from a product of adjacent FFT output symbols, performing a second accumulation process for a real part extracted from the differential symbol, and outputting a metric value for frequency estimation; and
- comparing, by the carrier frequency synchronization apparatus, metric values for initial frequency estimation within a frequency offset estimation range and selecting and outputting a maximal metric value as a frequency offset estimate.

17. The method of claim 16, further comprising:
- correcting, by the carrier frequency synchronization apparatus, a frequency offset of data received by the reception stage in accordance with the selected frequency offset estimate.

18. The method of claim 16, wherein the metric value for the frequency estimation is defined by:

$$Z(f_n) = \text{Re}\left[\sum_m R[m]R^*[m+1]\right] \text{ and}$$

$$R[m] = \sum_{k=mN_1}^{(m+1)N_1-1} Y[k]p^*[k-f_n], \quad m = 0, 1, 2, \ldots,$$

where Y[k] is a k-th FFT output result for the OFDM symbol in the PRS position, $f_n$ is an integer multiple of a carrier frequency offset estimate, p[k−$f_n$] is a local PRS of a receiver with respect to $f_n$, p*[k−$f_n$] is a complex conjugate of p[k−$f_n$], R*[m+1] is a complex conjugate of R[m+1], and $N_1$ is an accumulation length of the first accumulation process.

19. The method of claim 16, wherein the metric value for the frequency estimation is defined by:

$$\hat{f}_n = \arg[\max_{f_n}[Z(f_n)]],$$

where p is an integer more than 0, Y[k] is a k-th FFT output result for the OFDM symbol in the PRS position, $f_n$ is an integer multiple of a carrier frequency offset estimate, p[k−f] is a local PRS of a receiver with respect to $f_n$, p*[k−$f_n$] is a complex conjugate of p[k −$f_n$], R*[m+1] is a complex conjugate of R[m+1], and $N_1$ is an accumulation length of the first accumulation process.

20. The method of claim 16, wherein the selected frequency offset estimate is defined by:

$$\hat{f}_n = \arg[\max_{f_n}[Z(f_n)]],$$

where $f_n$ is an integer multiple of a carrier frequency offset estimate and Z($f_n$) is the metric value for the frequency estimation.

21. The method of claim 16, wherein the PRS is constructed with a Pseudo Noise (PN) sequence that uses autocorrelation characteristics.

22. A method for carrier frequency synchronization by a carrier frequency synchronization apparatus in an Orthogonal Frequency Division Multiplexing (OFDM) system, the method comprising:

performing, by the carrier frequency synchronization apparatus, a first accumulation process for a value computed by multiplying a Phase Reference Symbol (PRS) generated from a reception stage by a Fast Fourier Transform (FFT) output signal for an OFDM symbol in a PRS position within a predefined frame;

acquiring, by the carrier frequency synchronization apparatus, a differential symbol from a product of adjacent FFT output symbols, performing a second accumulation process for a real part extracted from the differential symbol, and outputting a metric value for frequency estimation; and determining, by the carrier frequency synchronization apparatus, whether the metric value for initial frequency estimation exceeds a threshold, and selecting and outputting the metric value exceeding the threshold as a frequency offset estimate.

23. The method of claim 22, further comprising:

correcting, by the carrier frequency synchronization apparatus, a frequency offset of data received by the reception stage in accordance with the selected frequency offset estimate.

24. The method of claim 23, wherein the metric value for the frequency estimation is defined by:

$$Z(f_n) = \text{Re}\left[\sum_m R[m]R^*[m+1]\right] \text{ and}$$

$$R[m] = \sum_{k=mN_1}^{(m+1)N_1-1} Y[k]p^*[k-f_n], \quad m = 0, 1, 2, \ldots,$$

where Y[k] is a k-th FFT output result for the OFDM symbol in the PRS position, $f_n$ is an integer multiple of a carrier frequency offset estimate, p[k−$f_n$] is a local PRS of a receiver with respect to $f_n$, p*[k−$f_n$] is a complex conjugate of p[k−$f_n$], R*[m+1] is a complex conjugate of R[m+1], and $N_1$ is an accumulation length of the first accumulation process.

25. The method of claim 23, wherein the metric value for the frequency estimation is defined by:

$$Z(f_n) = \left|\sum_m R[m]R^*[m+1]\right|^p \text{ and}$$

$$R[m] = \sum_{k=mN_1}^{(m+1)N_1-1} Y[k]p^*[k-f_n], \quad m = 0, 1, 2, \ldots,$$

where p is an integer more than 0, Y[k] is a k-th FFT output result for the OFDM symbol in the PRS position, $f_n$ is an integer multiple of a carrier frequency offset estimate, p[k−$f_n$] is a local PRS of a receiver with respect to $f_n$, p*[k−$f_n$] is a complex conjugate of p[k −$f_n$], R*[m+1] is a complex conjugate of R[m+1], and $N_1$ is an accumulation length of the first accumulation process.

26. The method of claim 23, wherein the PRS is constructed with a Pseudo Noise (PN) sequence that uses autocorrelation characteristics.

27. A method for carrier frequency synchronization by a carrier frequency synchronization apparatus in an Orthogonal Frequency Division Multiplexing (OFDM) system, the method comprising:

performing, by the carrier frequency synchronization apparatus, a first accumulation process for a value computed by multiplying a Phase Reference Symbol (PRS) generated from a reception stage by a Fast Fourier Transform (FFT) output signal for an OFDM symbol in a PRS position within a predefined frame;

acquiring, by the carrier frequency synchronization apparatus, a differential symbol from a product of adjacent FFT output symbols, performing a second accumulation process for a real part extracted from the differential symbol, and outputting a metric value for frequency estimation;

determining, by the carrier frequency synchronization apparatus, whether a frequency index related to the metric value for the frequency estimation is last; and selecting and outputting, by the carrier frequency synchronization apparatus, a frequency index comprising a maximal value of metric values stored in frequency indexes as a frequency offset estimate when the related frequency index is determined to be last.

28. The method of claim 27, further comprising:
correcting, by the carrier frequency synchronization apparatus, a frequency offset of data received by the reception stage in accordance with the frequency offset estimate.

29. The method of claim 27, wherein the metric value for the frequency estimation is defined by:

$$Z(f_n) = \text{Re}\left[\sum_m R[m]R^*[m+1]\right] \text{ and}$$

$$R[m] = \sum_{k=mN_1}^{(m+1)N_1-1} Y[k]p^*[k-f_n], \quad m = 0, 1, 2, \ldots,$$

where Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of $R[m+1]$, and $N_1$ is an accumulation length of the first accumulation process.

30. The method of claim 27, wherein the metric value for the frequency estimation is defined by:

$$Z(f_n) = \left|\sum_m R[m]R^*[m+1]\right|^p \text{ and}$$

$$R[m] = \sum_{k=mN_1}^{(m+1)N_1-1} Y[k]p^*[k-f_n], \quad m = 0, 1, 2, \ldots,$$

where p is an integer more than 0, Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of $R[m+1]$, and $N_1$ is an accumulation length of the first accumulation process.

31. The method of claim 27, wherein the selected frequency offset estimate is defined by:

$$\hat{f}_n = \arg\left[\max_{f_n}[Z(f_n)]\right],$$

where $f_n$ is an integer multiple of a carrier frequency offset estimate and $Z(f_n)$ is the metric value for the frequency estimation.

32. The method of claim 27, wherein the PRS is constructed with a Pseudo Noise (PN) sequence that uses autocorrelation characteristics.

33. A method for carrier frequency synchronization by a carrier frequency synchronization apparatus in an Orthogonal Frequency Division Multiplexing (OFDM) system, the method comprising:
performing, by the carrier frequency synchronization apparatus, a first accumulation process for a value computed by multiplying a Phase Reference Symbol (PRS) generated from a reception stage by a Fast Fourier Transform (FFT) output signal for an OFDM symbol in a PRS position within a predefined frame; and
acquiring, by the carrier frequency synchronization apparatus, a differential symbol from a product of adjacent FFT output symbols, performing a second accumulation process for a real part extracted from the differential symbol, and outputting a metric value for frequency estimation.

34. The method of claim 33, further comprising comparing, by the carrier frequency synchronization apparatus, a plurality of the metric values for initial frequency estimation within a frequency offset estimation range and selecting and outputting a maximal metric value as a frequency offset estimate.

35. The method of claim 33, further comprising determining, by the carrier frequency synchronization apparatus, whether the metric value for initial frequency estimation exceeds a threshold, and selecting and outputting a metric value exceeding the threshold as a frequency offset estimate.

36. The method of claim 33, further comprising:
determining, by the carrier frequency synchronization apparatus, whether a frequency index related to the metric value for the frequency estimation is last; and
selecting and outputting, by the carrier frequency synchronization apparatus, a frequency index comprising a maximal value of metric values stored in frequency indexes as a frequency offset estimate when the related frequency index is determined to be last.

37. The method of claim 33, further comprising:
correcting, by the carrier frequency synchronization apparatus, a frequency offset of data received by the reception stage in accordance with the frequency offset estimate.

38. The method of claim 33, wherein the metric value for the frequency estimation is defined by:

$$Z(f_n) = \text{Re}\left[\sum_m R[m]R^*[m+1]\right] \text{ and } R[m] = \sum_{k=mN_1}^{(m+1)N_1-1} Y[k]p^*[k-f_n],$$

$$m = 0, 1, 2, \ldots,$$

where Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of $R[m+1]$, and $N_1$ is an accumulation length of the first accumulation process.

39. The method of claim 33, wherein the metric value for the frequency estimation is defined by:

$$Z(f_n) = \left|\sum_m R[m]R^*[m+1]\right|^p \text{ and}$$

$$R[m] = \sum_{k=mN_1}^{(m+1)N_1-1} Y[k]p^*[k-f_n], \quad m = 0, 1, 2, \ldots,$$

where p is an integer more than 0, Y[k] is a k-th FFT output result for the OFDM symbol in the PRS position, $f_n$ is an integer multiple of a carrier frequency offset estimate, $p[k-f_n]$ is a local PRS of a receiver with respect to $f_n$, $p^*[k-f_n]$ is a complex conjugate of $p[k-f_n]$, $R^*[m+1]$ is a complex conjugate of $R[m+1]$, and $N_1$ is an accumulation length of the first accumulation process.

40. The method of claim 36, wherein the selected frequency offset estimate is defined by:

$$\hat{f}_n = \arg\left[\max_{f_n}[Z(f_n)]\right],$$

where $f_n$ is an integer multiple of a carrier frequency offset estimate and $Z(f_n)$ is the metric value for the frequency estimation.

41. The method of claim 33, wherein the PRS is constructed with a Pseudo Noise (PN) sequence that uses autocorrelation characteristics.

* * * * *